(12) United States Patent
Slesinski

(10) Patent No.: US 6,938,731 B2
(45) Date of Patent: Sep. 6, 2005

(54) DRIVE AXLE ASSEMBLY WITH INSERT

(75) Inventor: Steven G. Slesinski, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 210 days.

(21) Appl. No.: 10/358,833

(22) Filed: Feb. 5, 2003

(65) Prior Publication Data

US 2004/0149519 A1 Aug. 5, 2004

(51) Int. Cl.$^7$ ............................................. F01M 1/10
(52) U.S. Cl. ................... 184/6.25; 184/11.1; 184/13.1; 74/606 R
(58) Field of Search .................. 184/6.21, 6.24, 184/6.25, 6.12, 11.1, 13.1; 74/606 R; 475/72, 73, 74, 75, 80, 81

(56) References Cited

U.S. PATENT DOCUMENTS

| | | |
|---|---|---|
| 2,622,699 A | 12/1952 | Mills |
| 3,182,527 A | 5/1965 | Bryan ........................ 74/713 |
| 3,838,751 A | 10/1974 | Brown ...................... 184/6.12 |
| 3,847,249 A | 11/1974 | Oehring .................... 184/6.12 |
| 4,244,242 A | 1/1981 | Uno et al. .................... 74/710 |
| 5,197,929 A | 3/1993 | Scheiber et al. |
| 5,294,350 A * | 3/1994 | Murphy et al. ............. 210/168 |
| 5,505,112 A | 4/1996 | Gee ......................... 74/606 R |
| 5,709,135 A | 1/1998 | Baxter |
| 5,839,327 A | 11/1998 | Gage .......................... 74/607 |
| 6,105,464 A * | 8/2000 | Shimizu ................... 74/606 R |
| 6,132,329 A | 10/2000 | Tison ......................... 475/160 |
| 6,135,241 A | 10/2000 | Ganguly et al. ........... 184/11.1 |
| 6,186,277 B1 | 2/2001 | Tervo ........................ 184/6.12 |
| 6,267,203 B1 | 7/2001 | Brissette et al. ........... 184/6.12 |
| 6,626,065 B2 * | 9/2003 | Arnold et al. ............. 74/730.1 |
| 6,779,421 B2 * | 8/2004 | Arnold et al. ............. 74/730.1 |
| 2003/0000337 A1 | 1/2003 | Camping |
| 2003/0192402 A1 * | 10/2003 | Arnold et al. ............. 74/730.1 |

FOREIGN PATENT DOCUMENTS

JP 07217725 8/1995

* cited by examiner

Primary Examiner—David M. Fenstermacher
(74) Attorney, Agent, or Firm—Dykema Gossett PLLC

(57) ABSTRACT

A drive axle assembly is provided which includes a gear housing and differential gear set. An insert is provided which is disposed in a lubricant reservoir of the gear housing. The insert directs lubricant away from the reservoir upon rotation of the differential gear housing.

17 Claims, 3 Drawing Sheets

DRIVE AXLE ASSEMBLY WITH INSERT

BACKGROUND OF THE INVENTION

1. Field of the Invention

The field of the present invention is drive axle assemblies and more particularly, drive axle assemblies commonly used in trucks.

2. Discussion of Related Art

Many trucks have a drive axle assembly which includes a gear housing provided by an integral axle housing. The gear housing has a front opening to allow for connection of its input shaft with an exterior yoke or flange which is in turn connected with a drive shaft of the vehicle. The input shaft powers a pinion gear which is meshed with a ring gear. The ring gear is connected with a differential carrier. The carrier is connected with a spider having spider gears rotatively mounted thereon. The spider gears are meshed with opposing side gears. The side gears are connected with two side journals or half shafts. The half shafts extend laterally outward from the gear housing to drive the drive wheels of the vehicle. The gear housing is either integral with or fixably connected with an axle housing. The axle housing encloses the half shafts.

The gear housing has an opening to allow for the insertion of the various components of the differential gear set. An enclosure member is provided to close the opening. The enclosure member and gear housing provides a lubricant reservoir, which is commonly filled with oil. The function of the oil is to lubricate the primary gearing, differential gear set and associated bearings. Oil is allowed to flow through the axle housings and also to lubricate the half shaft bearings which are most adjacent to the connected wheels. The rotation of the ring gear causes the lubricant to be circulated within the gear housing.

Various contaminants can be present within the lubricant. Foundry sand may be present due to insufficient cleaning of the housing before the axle assembly operation. Working of the various gears within the gear housing can cause particles of metal to be produced within the lubricant. Such particles can cause undesirable wear upon the gear train and inhibit the proper flow of lubricant throughout the axle assembly.

Another consideration in the design of drive axle assemblies is to reduce the temperature of the lubricant to maximize the lubricant's effective life. The churning of the lubricant within the reservoir by the ring gear causes the lubricant temperature to rise. To cool the lubricant it is desirable that as much lubricant as possible passes out of the gear housing and into the arms of the axle housings or in the suspension within the gear housing atmosphere. Movement of lubricant into the axle housing arms is also desirable to ensure proper lubrication for the inboard and outboard bearings that support the half shafts.

To maximize fuel efficiency of the vehicle it is desirable to reduce vehicular weight. Therefore it is desirable to provide a drive axle assembly housing wherein the mass of lubricant within the axle housing can be held to a minimum and reduce component churning efficiency loss that will reduce energy consumption.

SUMMARY OF THE INVENTION

To make manifest the aforementioned desires, a revelation of the present invention is brought forth. In a preferred embodiment the present invention provides an insert which is placed within the gear housing to displace volume of the lubricant reservoir formed therein. The insert can be fabricated to be hollow or a solid polymeric body, which provides two significant advantages. The first advantage is that a significant amount of lubricant is displaced from its reservoir within the gear housing and is pushed towards the side arms of the axle housing to better lubricate the inboard and outboard bearings of the half shafts. Additionally the insert can have pockets formed therein. The pockets form enclosed pools which are accessible from the top. Placed within the pockets of the insert are magnets. Ferro metallic contaminants within the lubricating oil are held within the pockets by the magnets placed within the pockets.

It is an advantage of the present invention to provide a drive axle assembly having an insert which displaces liquid within the lubricant reservoir of the gear housing while providing pockets having magnets located therein for the entrapment of ferro metallic contaminants within the lubrication oil.

The above noted and other advantages of the present invention will be more apparent to those skilled in the art as the present invention is further revealed in the accompanying drawings and detailed description.

DETAILED DESCRIPTION OF THE INVENTION

Figure 1:
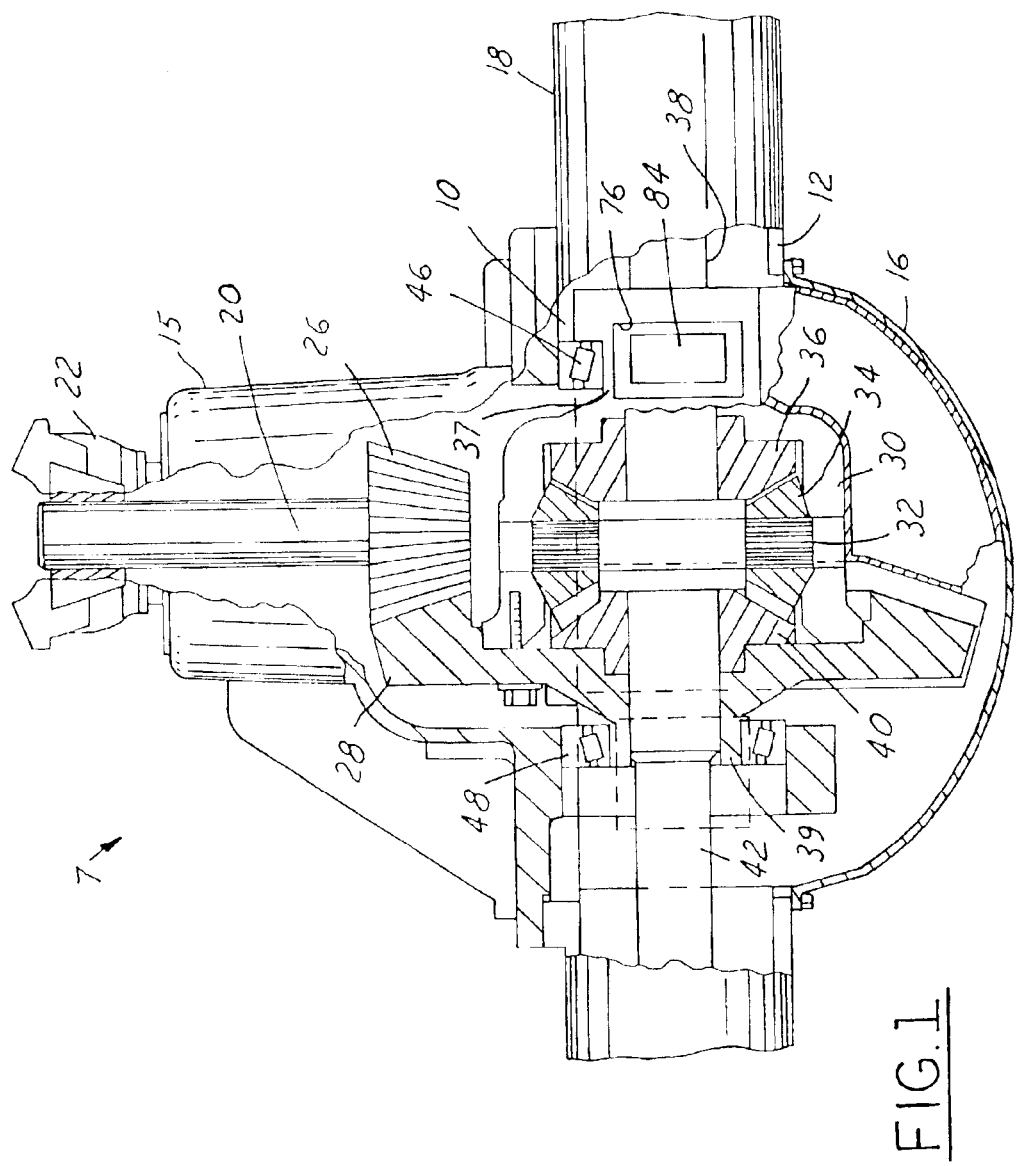
FIG. 1 is a partially sectioned top view of a preferred embodiment axle housing according to the present invention.
Figure 2:
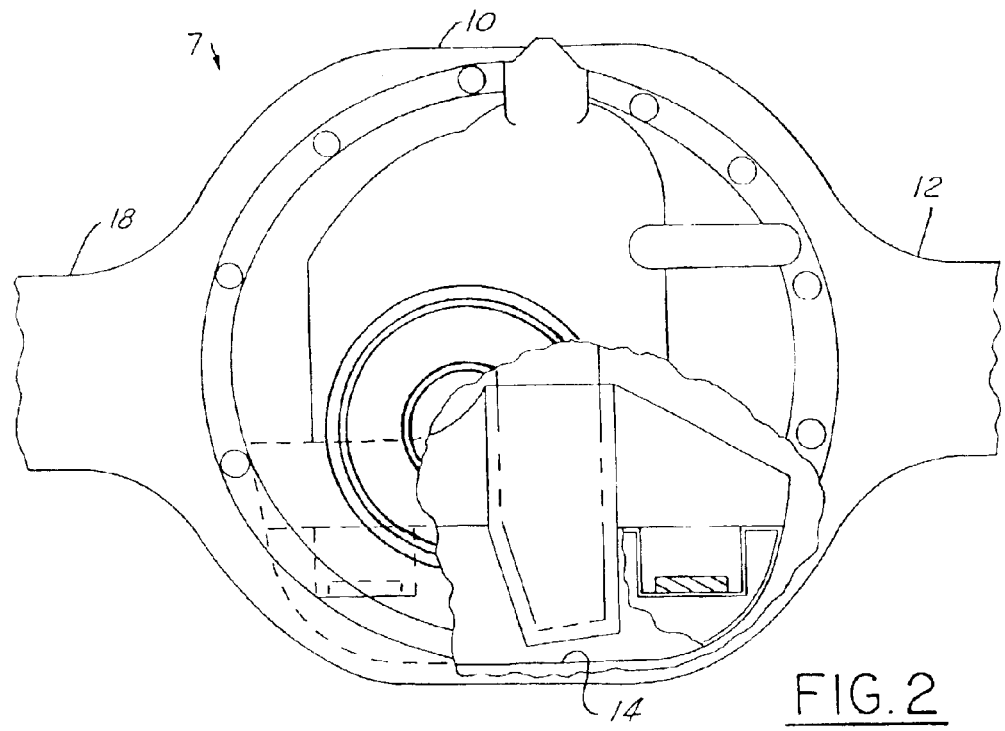
FIG. 2 is a partially sectioned front elevational view of the axle housing assembly shown in FIG. 1 illustrating placement of the inventive insert therein.
Figure 3:
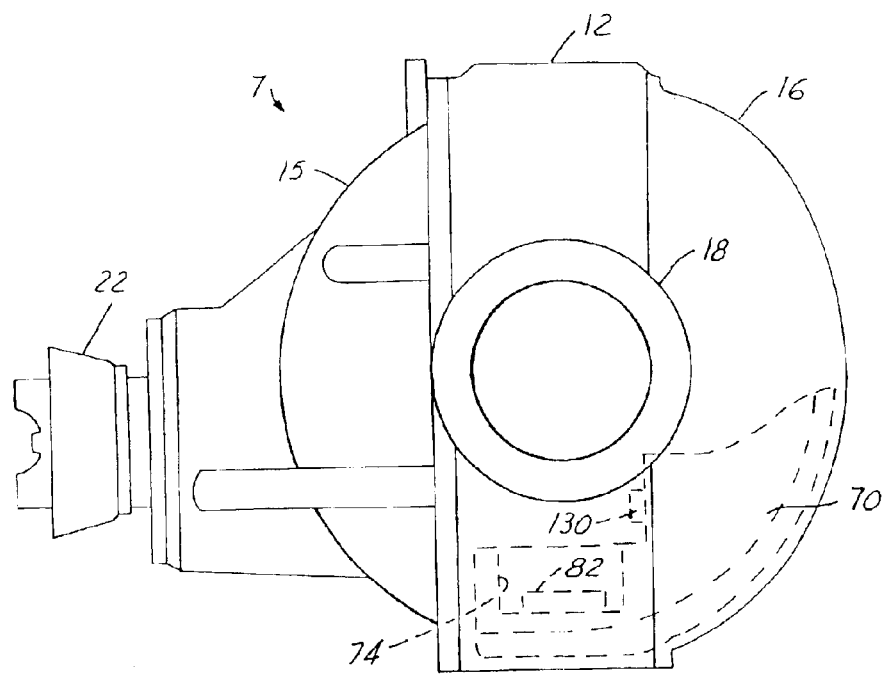
FIG. 3 is a side elevational view of the axle assembly shown in FIGS. 1 and 2.
Figure 4:
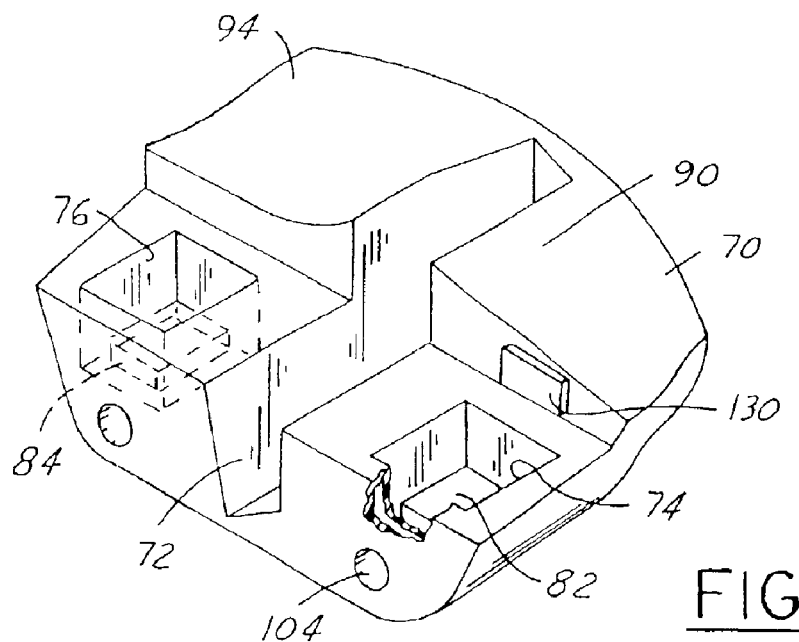
FIG. 4 is a perspective view of the insert shown in FIGS. 1 through 3.

Referring to FIGS. 1–5 the drive axle assembly 7 of the current invention has a gear housing 10. The gear housing 10 is integrally formed by an axle housing 12. The axle housing 12 has a front opening 14. The front opening 14 is enclosed by an enclosure member provided by a carrier 15. The axle housing 12 has a rear opening which is covered by an enclosure member provided by an axle housing cover 16. The axle housing 12 has two integrally formed side arms 18. The gear housing 10 along with its connected enclosure members provided by carrier 15 and axle housing cover 16 provides a lubricant reservoir which will be filled with a lubricating oil.

Rotatably mounted by front and rear bearings (not shown) within the carrier 15 is an input shaft 20. The input shaft 20 is connected with a yoke or flange 22 to receive torsional force from a drive shaft (not shown) of the vehicle. A rear end of the input shaft 20 is connected with a pinion gear 26. Pinion gear 26 is meshed with a ring gear 28. The ring gear 28 mounts a differential carrier 30. The carrier 30 mounts a differential spider 32 which has a plurality of spider gears 34 mounted thereon. The spider gears engage with a side gear 36. The side gear 36 is connected with a half shaft or side journal 38. Another side gear 40 which is connected with a side journal 42 also meshes with the spider gears 34 completing the differential gearing of the drive axle assembly 7.

The side journal 38 is rotatably mounted within the axle housing by sleeve bearing (not shown). The sleeve bearing is fitted within an extension 37 of the differential carrier 30. The extension 37 is rotatively supported by a tapered roller bearing 46. In similar fashion the ring gear 28 has an extension 39. The ring gear extension 39 is mounted within the axle housing by a bearing 48. A sleeve bearing (not shown) supports the side journal 42 within the extension 39. The outboard ends of the side journals 38, 42 are supported by tapered roller bearings (not shown) fitted within the side arms 18 of the axle housing 12.

It is apparent to those skilled in the art that many drive axle assemblies have the carrier 15 integrally formed with the axle housing, thus providing a fastener attached axle housing cover. Alternatively, an axle housing cover may be integrally formed with the axle housing with a fastener attached carrier. Both arrangements are within the scope of the present invention.

As mentioned previously the gear housing 10, integral with the axle housing along with its connected enclosure members forms a lubricant reservoir. Disposed within the lubricant reservoir is an insert 70. The insert 70 (best shown in FIG. 4) can be fabricated from a hollow or solid piece of material. Preferable materials are a lightweight polymeric material such as closed-cell foam, ABS, PVC plastic or other suitable alternatives. The insert 70 has a ring gear pocket 72, which provides clearance for the ring gear 28 to rotate therethrough. The insert 70 additionally has contaminant pockets 74, 76. The contaminant pockets 74, 76 form an enclosed pool. The enclosed pool is accessible from the top. Placed within the bottom of the pockets 74, 76 are magnets 82, 84. The pockets 74, 76 are positioned underneath the respective bearings 46, 48. Ferro metallic contaminants from the bearings 46 or 48 or from other sources will be captured within the pockets 74, 76 by the magnets 82, 84.

The insert 70 also has deflector surfaces 90, 94 to direct the oil to interact with the ring gear outwardly towards the side arms 18 to lubricate the bearings 46, 48 and the outboard bearings.

Figure 5:
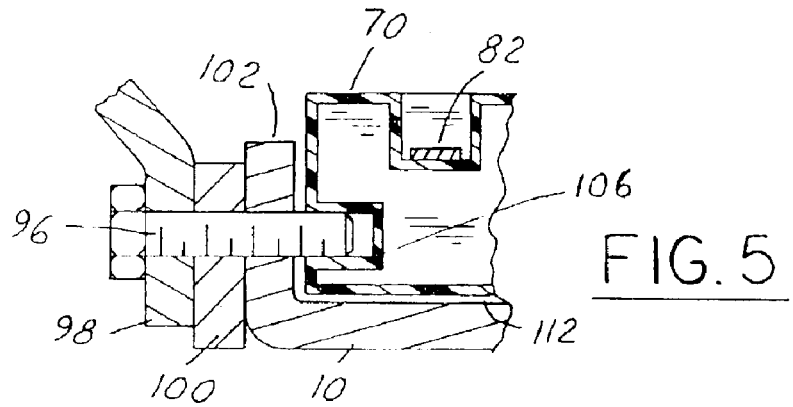
FIG. 5 is a sectional view illustrating the connection between the insert and gear housing.

Referring to FIG. 5, the insert 70 is connected with the gear housing 10 via, a fastener 96 that passes through a flange 98 of the carrier 15. The fastener 96 also passes through a ring 100 which abuts a flange 102 of the gear housing. The fastener 96 then threadably enters a bore 104 provided in a thickened portion 106 of the insert 70. The insert 70 fills a portion of the volume of the lubricant reservoir therefore reducing the total amount of lubricant required. By being hollow, an even greater weight savings is achieved by the insert's placement within the drive axle assembly. A slight clearance underneath the insert 70 provides a passage 112 that allows magnetic contaminants to be entrapped underneath the insert 70.

Figure 6:
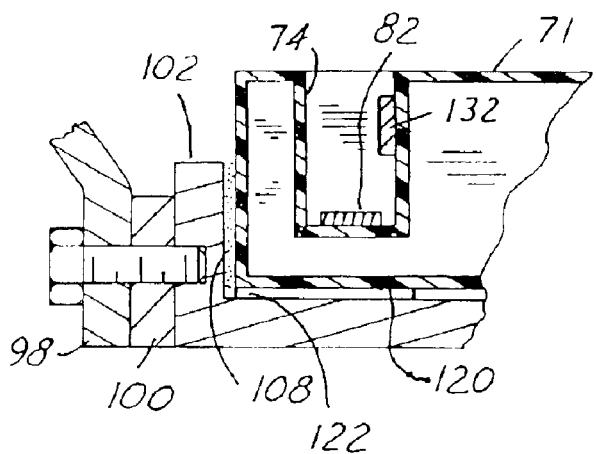
FIG. 6 is a view similar to FIG. 5 of an alternate preferred embodiment of the present invention.

Referring additionally to FIG. 6 with similar parts given like reference numerals, an insert 71 is connected with the gear housing by an adhesive patch 108. Passage 120 is provided between underlying ribs 122 of the insert 71. This allows ferro magnetic contaminants to be entrapped underneath the insert 71 by their attraction to the magnet 82. If desired, the inserts 70, 71 may be connected directly with the gear housing 10, with the opposite enclosure member provided by the axle housing cover 16, or held in position by portions of the gear housing features.

Referring back to FIG. 4, insert 70 has a filter media 130 connected thereto to entrap lubricant contaminants. Insert 71 has a filter 132 which is positioned within its pocket 74.

The present invention has been shown in various embodiments. However, it will be apparent to those skilled in the art of the various modifications and changes which can be made to the invention without departing from the spirit or scope of the invention as it is encompassed by the following claims. This includes, but is not limited to multiple piece construction options.

What is claimed is:

1. A drive axle assembly, comprising:
   a gear housing;
   a differential gear set disposed within said gear housing;
   an enclosure member connected to said gear housing and enclosing an opening formed in said gear housing, said gear housing and said enclosure member forming a lubricant reservoir through which a member of said differential gear set rotates; and
   a hollow insert disposed in said lubricant reservoir, said insert filling a portion of a volume defining said lubricant reservoir and directing lubricant away from said lubricant reservoir upon rotation of said differential gear set.

2. A drive axle assembly as described in claim 1, wherein said insert has a pocket forming an enclosed pool accessible from the top to capture lubricants therein, said pocket having a magnet placed within.

3. A drive axle assembly as described in claim 2, wherein said pocket is positioned underneath a bearing.

4. A drive axle assembly as described in claim 2 wherein said insert has a plurality of pockets.

5. A drive axle assembly as described in claim 1, wherein said insert is connected with a filter for filtering lubricants within said gear housing.

6. A drive axle assembly as described in claim 1, wherein said insert is disposed within said gear housing by a fastener connecting said enclosure member with said gear housing.

7. A drive axle assembly as described in claim 1, wherein said insert is adhesively connected with said gear housing.

8. A drive axle assembly as described in claim 2, wherein said insert has a passage with respect to said gear housing underneath said insert adjacent said pocket to allow contaminants within said lubricating oil to be settled therein.

9. A drive axle assembly as described in claim 1 having a filter connected with said insert.

10. A drive axle assembly, comprising:
    a gear housing;
    a differential gear set disposed within said gear housing;
    an enclosure member connected to said gear housing and enclosing an opening formed in said gear housing, said gear housing and said enclosure member forming a lubricant reservoir through which a member of said differential gear set rotates; and
    an insert disposed in said lubricant reservoir, said insert filling a portion of a volume defining said lubricant reservoir, said insert having a pocket forming an enclosed pool accessible from the top to capture lubricants therein, said pocket having a magnet placed therein.

11. A drive axle assembly as described in claim 10, wherein said insert is hollow.

12. A drive axle assembly as described in claim 10 wherein said insert has a plurality of pockets.

13. A drive axle assembly as described in claim 10, wherein said insert is connected with a filter for filtering lubricants within said gear housing.

14. A drive axle assembly as described in claim 10, wherein said insert is connected with said gear housing with a fastener connecting said enclosure member with said gear housing.

15. A drive axle assembly as described in claim 10, wherein said insert is adhesively connected with said gear housing.

16. A drive axle assembly as described in claim 10, wherein said insert has a deflector to direct lubricating oil laterally outward from said gear set.

17. A drive axle assembly as described in claim 10, wherein said insert has a passage with respect to said gear housing underneath said insert adjacent said pocket to allow contaminants within said lubricating oil to be settled therein.

* * * * *